United States Patent Office 3,322,732
Patented May 30, 1967

3,322,732
SELF-COPOLYMERIZABLE ESTERS OF UNSATURATED DIBASIC ACIDS AND 6-HYDROXY-3α,4,5,6,7,7α-HEXAHYDRO-4,7-METHANOINDENE
Shiro Tsuruta, Wataru Koga, Masahiro Abo, and Shokichi Abe, Hitachi-shi, Japan, assignors to Hitachi Kasei Kogyo Kabushiki Kaisha, Tokyo, Japan, a corporation of Japan
No Drawing. Filed June 27, 1963, Ser. No. 290,949
Claims priority, application Japan, June 28, 1962, 37/26,525
19 Claims. (Cl. 260—78.5)

This invention relates to resinous compositions of which shrinkage ration at curing are very small. It is well known that unsaturated polyester resins can be manufactured by poly-esterification reacting α,β-unsaturated dibasic acids such as maleic anhydride and fumaric acid with dihydric alcohols or polyhydric alcohol.

In order to cure polyester resins thus obtained three-dimensionally, the polyester resins must be dissolved in co-polymerizable vinyl monomers such as styrene, vinyl-toluene or diallyl phthalate, etc., and furthermore, must be cured being added with peroxide catalysts, curing accelerators and other additives under heated or normal conditions.

It is known that the shrinkage ratios, at the curing step of polyester resins including co-polymerizable monomers as components of the resinous compositions as abovementioned, are very large and usually attain to 7–12 percent.

The shrinkage yields deficiencies such as distortions in products, crackings or strippings between laminate base materials, in using the obtained resins as casting materials, laminating materials or moulding materials.

And, moreover, to include volatile matter as styrene in the compositions yields unfavorable deficiencies for sanitary properties and handlings besides large shrinkage ratios.

In contrast with said unsaturated polyester resins, epoxy resins and prepolymers of diallyl phthalates are perfect reaction type resins that can be cured without generating by-product gases, and their shrinkages at the curing are relatively small; although they are known as excellent resinous materials, extensive uses for general purposes have been rather restricted yet by the high prices.

The first object of the present invention is to provide self-copolymerizable resinous compositions of perfect reaction type having very small shrinkage ratio.

The second object is to obtain economical self-copolymerizable resinous compositions starting from monomers of very low price.

Another object is to supply resins compositions suitable for resinous materials especially casting materials, laminating materials, pre-pregnant materials and premix materials, etc.

And further objects will be clear from following descriptions.

The self-copolymerizable resins compositions of this invention can be obtained by mixing the linear monoesters or polyesters, that include within the same molecule (a) at least one α,β-unsaturated dibasic acids and (b) at least one 6 - hydroxy-3α,4,5,6,7,7α-hexahydro-4,7-methanoindenes (hereinafter mentioned briefly as hydroxyl dicyclopentadiene) as copolymerizable compounds combined by ester linkage, with peroxides and, if necessary, with other additives.

Linear monoesters or polyesters used in this invention include as essential materials of the compositions α,β-unsaturated dibasic acid molecules such as maleic anhydride or fumaric acid, and hydroxyl dicyclopentadiene molecule.

Carbon-carbon double bonds of both molecules can be co-existent in the same molecule maintained stable during the formation of the ester or the polyester, and both can copolymerize mutually under the presence of curing catalysts.

Namely, the composition of the present invention has an essential difference from the known unsaturated polyester resins in the following point. In general, the prior resin is first formed into a so-called molecular dispersion in which a two-dimensional polyester molecule containing an α,β-unsaturated dibasic acid is dissolved in a vinyl monomer and thereafter three-dimensionally cured. In the present invention, on the other hand, two mutually copolymerizable molecules are chemically combined into a molecule, which is then three-dimensionally cured without an additional monomer, such as styrene, being added. That is, the two-dimensional molecules per se in the composition of the present invention have copolymerizability with each other.

Hydroxyl dicyclopentadienes can be produced from dicyclopentadienes that is obtained in large quantity at low cost as a by-product in iron and steel industry and petro-chemical industry, or alkyl derivatives of dicyclopentadiene.

Explaining further, hydroxyl dicyclopentadiene can be obtained by addition of water to the abovementioned dicyclopentadiene (including its alkyl derivatives) under the presence of acid catalysts as sulfuric acid; and the structural formula is as follows:

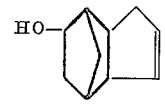

In this invention, merely one sort of hydroxyl dicyclopentadienes may be used, or a mixture of more than one sort of alkyl derivatives of hydroxyl dicyclopentadiene may be used.

As aforementioned, commercially manufactured dicyclopentadienes are not obtained as the pure products, but as mixtures with 0–30 percent by weight of the alkyl derivatives containing $C_{11}$–$C_{13}$ fractions, therefore, hydroxyl dicyclopentadienes obtained by addition of water to the said crude raw materials are not pure.

Resinous compositions using such mixtures, however, are not different substantially from those using pure hydroxyl dicyclopentadiene.

Such being the case, hydroxyl dicyclopentadienes in this invention mean not only pure one but also mixtures with the alkyl derivatives. Molar ratio of α,β-unsaturated dibasic acids to hydroxyl dicyclopentadienes in the linear molecule can be changed in the range from 1:10 to 10:1, especially preferably in the range from 1:3 to 3:1.

An example of preparing hydroxyl dicyclopentadienes is shown next.

At first, 800 g. of 25 percent sulfuric acid aqueous solution is added to 286 g. (1.86 mol) of dicyclopentadiene, and the solution is reacted with hard agitation for 5 hours at 104°–107° C.

Next, oil phase of the reaction liquid is separated by a separating funnel, and fractionally distillated in precise under reduced pressure. Then, 252 g. (83 percent of the theoretical amount) of hydroxyl dicyclopentadiene, of which boiling point is 92°–93° C. under 3 mm. Hg pressure, is obtained. This product is found such that $n_D^{25}$=1.5246, $\alpha_4^{25}$=1.0773, and that the molecular formula is shown as $C_{10}H_{14}O$ by elementary analysis.

The hydroxyl group combined with 6-position carbon atom of hydroxyl dicyclopentadiene readily forms ester linkage with a carboxylic acid by usual esterification process, and under such esterification the double bond between 2- and 3-positioned carbon atoms of hydroxyl dicyclopentadiene is maintained stable.

Accordingly, linear molecules thus obtained can be polymerized and cured three-dimensionally by mixing with additives of peroxides, curing accelerators and others.

Namely, the unsaturated double bond between 2- and 3-position carbon atoms existing after the esterification of the hydroxyl group combined with 6-position carbon atom, and, a double bond of $\alpha,\beta$-unsaturated dibasic acids, copolymerize readily under the presence of peroxides.

As for $\alpha,\beta$-unsaturated dibasic acids, maleic anhydride, maleic acid and fumaric acid etc. can be used, and they can be used by one kind of acid only or as mixtures of more than two acids.

The resin compositions of this invention can be obtained, the objects being attained enough, by esterifications of aforementioned $\alpha,\beta$-unsaturated dibasic acids and hydroxyl dicyclopentadiene only; however, together with polyhydric alcohols such as ethylene glycol, propylene glycol, diethylene glycol, glycerol, trimethylol propane, trimethylol ethane, pentaerythritol, sorbitol, 2,2,6,6-tetramethylol cyclohexanol, and anhydro-enneaheptitol, they can be changed suitably without difficulty for various resins and curing resinous characteristics in accordance with the purposes such as casting materials, laminating materials, pre-preg materials and so on, by adjusting molecular weights, shapes of molecule and density of cross linkage etc.

And as for acid molecules included in the linear molecules, they are not necessarily defined as only $\alpha,\beta$-unsaturated dibasic acids, but polybasic acids such as phthalic anhydride, isophthalic acid, terephthalic acid, glutaric acid, pimelic acid, adipic acid, sebacic acid, isosebasic acid, 3,6-endomethylene tetrahydrophthalic acid, tetrahydrophthalic anhydride, trimellitic acid, and pyromellitic acid, can be used together with same significance as aforementioned case of using polyhydric alcohols together. And (especially for the object of adjusting viscosity, aliphatic and/or aromatic monohydric alcohols, or, aliphatic and/or aromatic monobasic acids can be used together advantageously.

As for peroxides used in this invention, ditertiary butyl peroxide, benzoyl peroxide, and cyclohexanone peroxide etc. are suitable, and they can be used by one kind of peroxide only or with two or more kinds of peroxides.

The peroxides are used from 0.01 to 5 parts by weight, preferably from 0.1 to 2 parts by weight, based on 100 parts by weight of the linear self-copolymerized resins.

The resinous compositions of this invention consist of the aforementioned two components basically, however, various additives can be added and mixed with them for the purposes of changing or improving viscosity, workability and reservedness of the resinous compositions, or, hardness and/or electric characteristics of the cured resins.

As for additives, there may be curing accelerators, copolymerizable vinyl monomers, stabilizers and fillers.

Curing accelerators, for example, are chosen properly from metal salts of naphthenic acids such as manganese, cobalt, or lead salts of naphthenic acids, or amines such as dimethylaniline, diethylaniline, phenylethanol amine, and N,N-dimethylparatoluidine.

Each of them belongs to redox system curing accelerators and they are added from 0.01 to 10 parts by weight, especially from 0.1 to 2 parts by weight, based on 100 parts by weight of self-copolymerized resins.

And, as for vinyl monomers used in this invention mainly as viscosity lowering agents for copolymerizable resins, copolymerizable vinyl monomers that are added to general unsaturated polyester resins are used.

For example, one sorts or more than two kinds among styrene, vinyltoluene, methyl ester of methacrylic acid, diallyl phthalate, and triallyl cyanurate. However, it must be noted that quantity of such vinyl monomers added should be less than to impair the excellent low shrinkage properties of the resinous compositions of this invention. And from such standpoint, vinyl monomers should be less than 50 parts by weight based on 100 parts by weight of the aforementioned self-copolymerizable resins.

As for stabilizers, hydroquinones, catechols, and ketooximes can be used. These have been used generally as stabilizers for conventional known unsaturated polyester resins. The stabilizers are to be added from 50 to 200 p.p.m. based on the self-copolymerizable resins. As for fillers, being added for casting materials etc., such conventional general fillers for resins as talc, calcium carbonate, or carbon black can be used.

Following examples are to explain this invention in more details, however, it must be understood that these examples do not limit the scope of this invention in any ways and that this invention can be practiced in various voluntary ways within the scope of the claims.

*Example 1*

315 g. (2.10 mol) of hydroxyl dicyclopentadiene, 196 g. (2 mol) of maleic anhydride, and 76 g. (1 mol) of propylene glycol were charged in a 1 litre flask with four necks. By esterification with agitation of this mixture heated to 150°–190° C. in carbon dioxide atmosphere, a viscous thin orange-yellow resinous composition having acid value of 12.9 was obtained after about 13 hours. By measuring its density by sink and float method in aqueous solution of sucrose, $d_4^{25}=1.192$ was obtained. Heated to 70° C., 0.5 g. of di-tertiary butyl peroxide were added to 20 g. of the resin and mixed homogeneously, then this mixture was heated to 140° C. About 45 minutes after, the mixture was completely cured. After grinding the cured resin with iron mortar, insoluble percentage of the cured resin in acetone was measured and found to be 97.7 percent.

The density of the cured resin, measured by sucrose solution method, was found to be 1.208, thus, comparing with the density before curing, the shrinkage ratio at curing was found to be only about 1.34%. And, in case of heating 10 g. of the resin with addition of 0.1 g. of benzoyl peroxide to 105° C. the resin was completely cured after about 30 minutes, and the density of the cured resin was 1.211, thus, the shrinkage ratio at curing was about 1.59 percent.

Thereafter, dissolving 10 g. of the cured resin in 5 cc. of acetone, 0.1 g. of cobalt salt of naphthenic acid (Co content 20 percent) was added and mixed with the solution, further, 0.2 g. of methyl ethyl ketone peroxide solution was added and mixed with homogeneously, then, the resultant solution was fluidly painted over a glass plate. The solution formed a film after about 3 hours, and was cured completely after about 15 hours.

*Example 2*

315 g. (2.10 mol) of hydroxyl dicyclopentadiene and 98 g. (1 mol) of maleic anhydride were charged in a 500 ml. flask with four necks. By esterification with agitation of this mixture heated to 170°–190° C. in carbon dioxide atmosphere, a thin orange resinous composition of a little fluidity having acid value of 9.1 was obtained after about 14 hours. By measuring the density of the resin, $d^{25}=1.149$ was found.

Heating 10 g. of the resin with addition of 0.2 g. of ditertiary butyl peroxide to 140° C., the resin gelled. The measured density of the cured resin was 1.189, and thus, the shrinkage ratio of after the curing to before the curing was recognized as about 3.48 percent.

Thereafter, 0.1 g. of cobalt salt of naphthenic acid (Co content 12%) was added and mixed, further, 0.2 g. of methyl ethyl ketone peroxide solution was added, then, the resultant solution left at room temperature began curing about 30 minutes after and was cured almost completely after 5 hours.

The density of the produced cured resin was 1.183, and the shrinkage ratio was 2.96 percent.

Example 3

315 g. of hydroxyl dicyclopentadiene, 196 g. of maleic anhydride, 328 g. of 3,6-endomethylene tetrahydrophthalic acid, and 228 g. of proylene glycol were charged in a 2 litres flask with four necks. By esterfication with agitation of this mixture heated to 150°–190° C., thin yellow resinous composition of solid at room temperature having acid value of about 10 was obtained after about 15 hours. The density of the resin was 1.197.

Thereafter, 20 g. of the compoistion were taken, added and mixed homogeneously with 0.5 g. of ditertiary butyl peroxide, then by heating the mixture to 70–80° C., the mixture was cured completely after 40 minutes.

The density of the cured resin was 1.215, and judging from this fact, the shrinkage ratio of the resin was recognized as 1.56 percent.

Example 4

150 g. of hydroxyl dicyclopentadiene, 46 g. of glycerol, 106 g. of diethylene glycol, 98 g. of maleic anhydride, 196 g. of adipic acid, and 107 g. of fatty acids of coconut oil were charged in a 1 litre flask with four necks. And the mixture was heated and esterified continuously until the acid value attained to 15. Orange yellows resinous composition thus obtained was about 200 poises at 25° C. and can be used as a casting resin.

After 2 parts of ditertiary butyl peroxide were added to 100 parts of the resin composition, the resultant composition was completely cured by heating to 140° C. for about 15 hours. The curing shrinkage ratio in this case was about 3.28 percent.

As explained above, the self-copolymerizable resinous compositions of this invention, can be manufactured starting from very low price materials and in simple processes, and, show very small shrinkage ratio at curing, furthermore, become cured resins of excellent characteristics.

What we claim is:

1. A self-copolymerizable composition comprising a mixture of a monoester or polyester containing as its constituents at least one $\alpha,\beta$-unsaturated dibasic acid and at least one 6-hydroxy-3,4,5,6,7,$\alpha$-hexahydro-4,7-methanoindene in the same molecule and a curing catalyst.

2. The composition of claim 1, wherein the curing catalyst is selected from the group consisting of ditertiary butyl peroxide, benzoyl peroxide, methyl ethyl ketone peroxide and cyclohexanone peroxide.

3. The composition of claim 2, wherein the curing catalyst is present in an amount of about 0.01 to 5 parts by weight, based on 100 parts by weight of the self-copolymerizable composition.

4. The composition of claim 1, wherein said $\alpha,\beta$-unsaturated acid is a compound selected from the group consisting of maleic anhydride, maleic acid, and fumaric acid.

5. The composition of claim 1, wherein the molar ratio of the $\alpha,\beta$-unsaturated dibasic acid to 6-hydroxy-3$\alpha$,4,5,6,7,7$\alpha$-hexahydro-4-7-methanoindene in the linear molecule is about 1:3 to 3:1.

6. The composition of claim 1, wherein a polyhydric alcohol is used in combination with said 6-hydroxy-3$\alpha$,4,5,6,7,7$\alpha$-hexahydro-4,7-methanoindene.

7. The composition of claim 6, wherein said polyhydric alcohol is selected from the group consisting of ethylene glycol, propylene glycol, diethylene glycol, glycerol, trimethylol propane, trimethylol ethane, pentaerythritol, sorbitol, 2,2,6,6-tetramethylol cyclohexanol, and anhydroenneaheptitol.

8. The composition of claim 1, wherein a polybasic acid other than said $\alpha,\beta$-unsaturated dibasic acid is used in combination with said $\alpha,\beta$-unsaturated dibasic acid.

9. The composition of claim 8, wherein said polybasic acid is selected from the group consisting of phthalic anhydride, isophthalic acid, terephthalic acid, glutaric acid, pimelic acid, adipic acid, sebacic acid, isosebacic acid, 3,6-endomethylene tetrahydrophthalic acid, tetrahydrophthalic anhydride, trimellitic acid, and pyromellitic acid.

10. The composition of claim 1, wherein a curing accelerator is used in combination with said curing catalyst.

11. The composition of claim 10, wherein said curing accelerator is selected from the group consisting of metal naphthenates and amines.

12. The composition of claim 11, wherein the curing accelerator is present in an amount of about 0.01 to 10 parts by weight based on 100 parts by weight of the self-copolymerizable composition.

13. The composition of claim 1, wherein a stabilizer is used in combination with said curing catalyst.

14. The composition of claim 13, wherein the stabilizer is selected from the group consisting of hydroquinones, catechols and keto-oximes.

15. The composition of claim 14, wherein the stabilizer is present in an amount of about 50 to 200 p.p.m. based on 100 parts by weight of the self-copolymerizable composition.

16. The composition of claim 1, which also contains a vinyl monomer.

17. The composition of claim 16, wherein the vinyl monomer is selected from the group consisting of styrene, vinyl toluene, the methyl ester of methacrylic acid, diallyl phthalate and triallyl cyanurate.

18. The composition of claim 17, wherein the vinyl monomer is present in an amount from 0 to about 50 parts by weight based on 100 parts by weight of the self-copolymerizable composition.

19. A polyester consisting essentially of at least one $\alpha,\beta$-unsaturated dibasic acid and at least one 6-hydroxy-3$\alpha$,4,5,6,7,7$\alpha$-hexahydro-4,7-methanoindene in the same molecule.

References Cited

FOREIGN PATENTS 597,224  5/1961  Belgium.

WILLIAM H. SHORT, *Primary Examiner.*

JOSEPH L. SCHOFER, DONALD CZAJA, *Examiners.*

J. NORRIS, *Assistant Examiner.*